Patented Nov. 1, 1927.

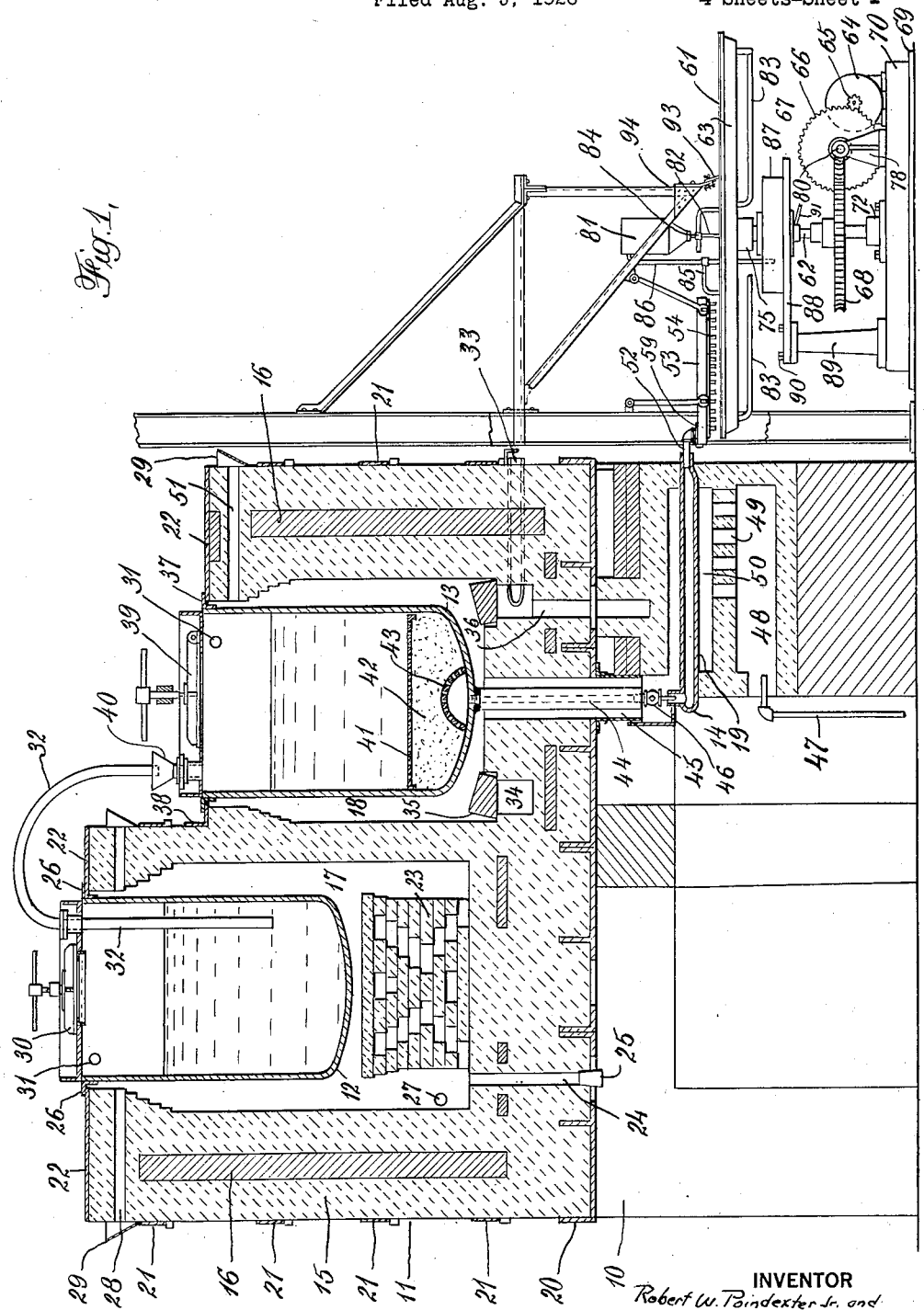

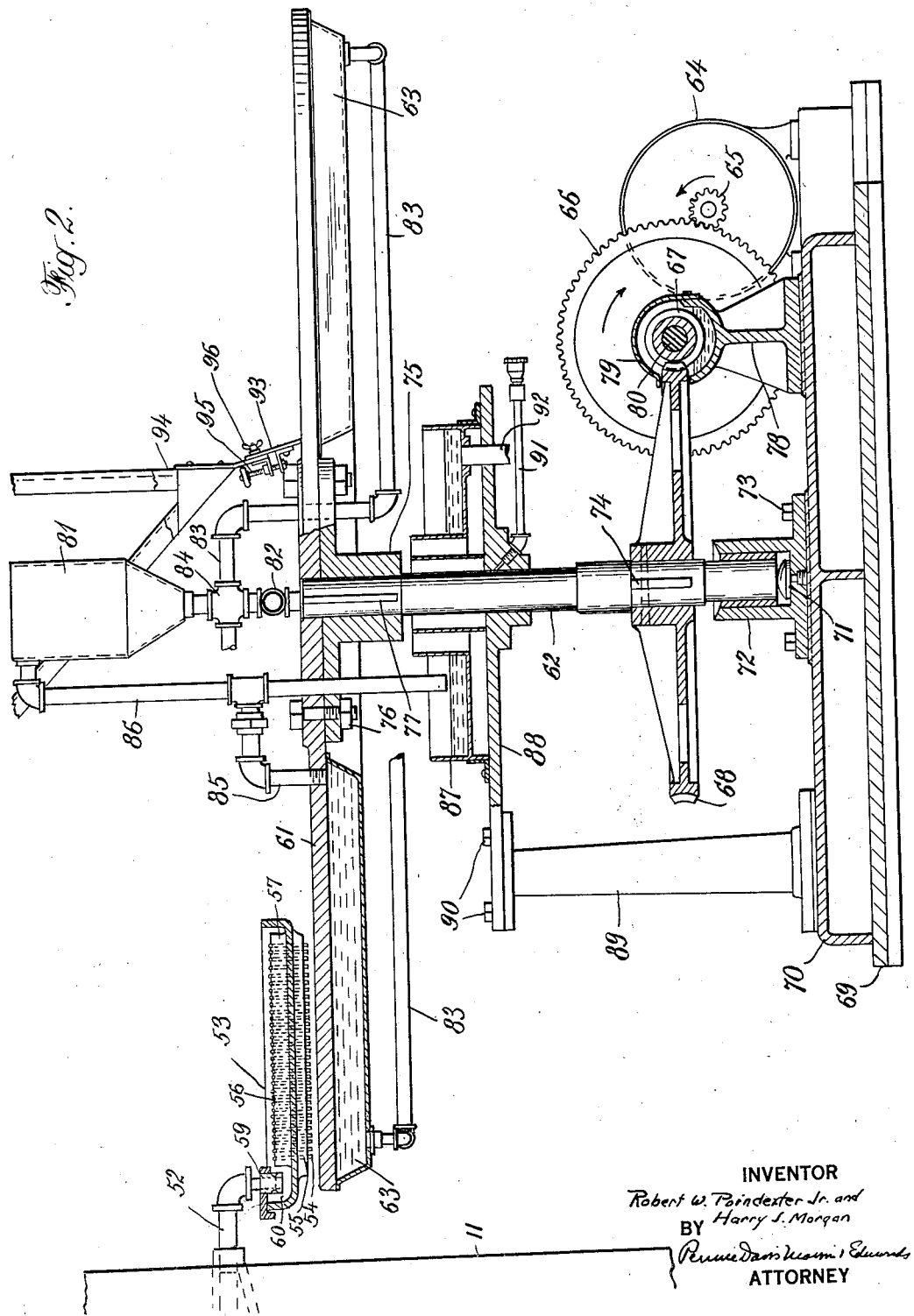

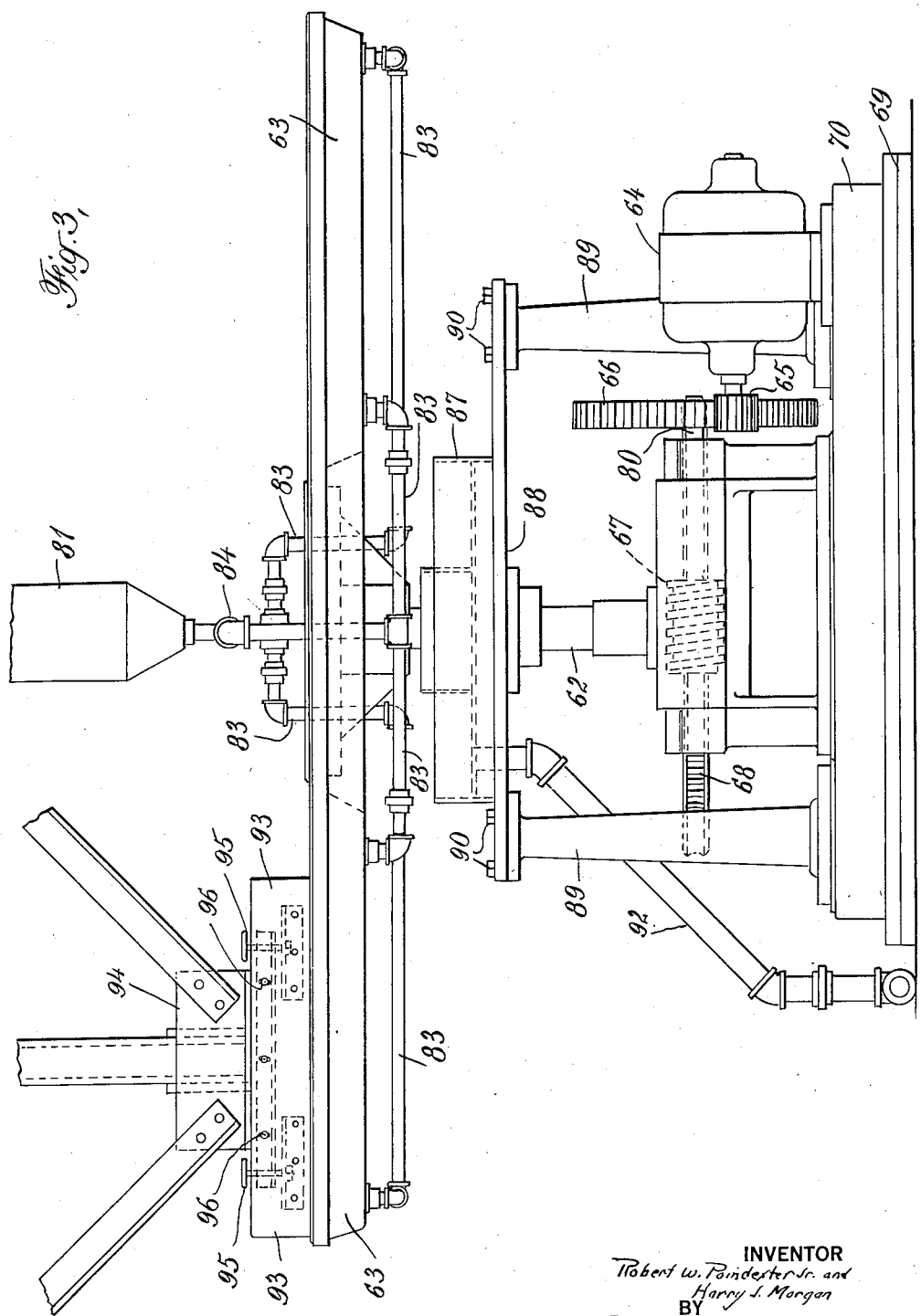

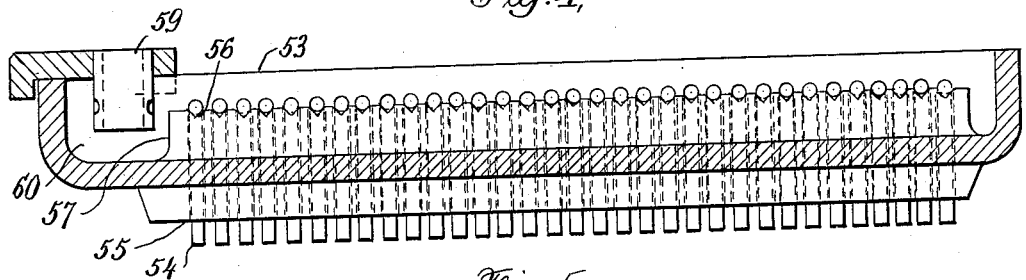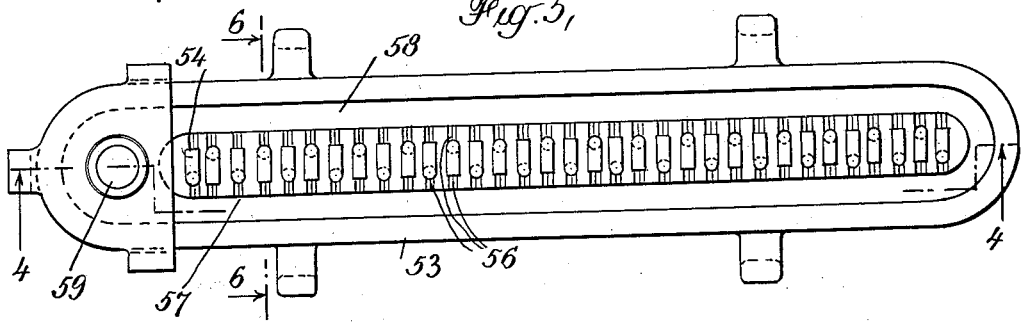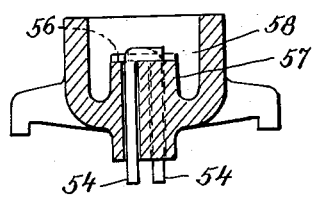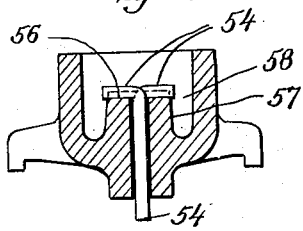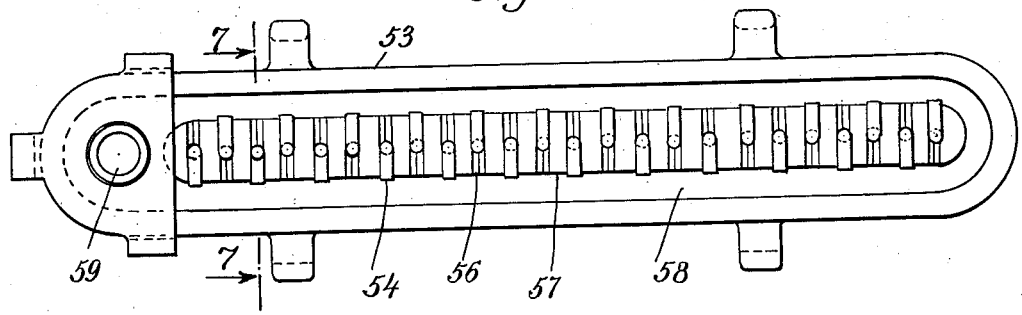

1,647,194

UNITED STATES PATENT OFFICE.

ROBERT W. POINDEXTER, JR., OF LOS ANGELES, AND HARRY J. MORGAN, OF WALNUT PARK, CALIFORNIA, ASSIGNORS TO CALIFORNIA CYANIDE COMPANY, INCORPORATED, OF NEW YORK, N. Y., A CORPORATION OF DELAWARE.

METHOD OF AND APPARATUS FOR MAKING PELLETS.

Application filed August 5, 1926. Serial No. 127,255.

This invention relates to a method and an apparatus for making pellets from chemical compounds, mixtures and the like.

The invention is more particularly directed to the preparation of alkali metal cyanides in pellet form, although it may be employed in making pellets from other materials such as alkali metal hydroxides, sulfides, carbonates, acetates, calcium chloride, calcium cyanide, and the like.

Sodium cyanide and similar products have been supplied to the market heretofore principally in bulk or in the form of sticks, eggs or flakes. In the case of packages put up in the bulk form, a great deal of difficulty is experienced in removing the bulk material from the container and in reducing it to lumps of convenient size. The sticks or eggs are cast in molds. Hence the preparation of products in these forms is relatively difficult and expensive. Flakes are not only difficult and expensive to make, but they have the added disadvantage of rapid disintegration into a form of undesirable dust, which is highly injurious to the health of those who handle the materials.

We have successfully avoided the disadvantages, objections and inconvenience of the highly unsatisfactory prior practice by the method and apparatus of our invention for forming pellets of substantially uniform size. Pellets have numerous advantages. They can be handled, weighed and packaged for commerce easily. Pellets are especially resistant to abrasion and consequently are not subject to dusting during handling and shipping. They also dissolve rapidly in water. The pellets are preferably relatively small in size, for example, about the size of a coffee bean, although the size may vary within a comparatively wide range.

The difficulty in preparing such pellets heretofore, particularly in the case of sodium cyanide, has been the lack of any successful method and apparatus for feeding the molten material to a cooling device, in such a manner that the pellets would be formed and solidified in a relatively short time. Numerous difficulties have been experienced in preventing the molten material from running together and forming irregular shapes of various kinds.

It is the object of our invention to form pellets from various materials in a simple and efficient manner and to promptly discharge the pellets when formed so that the apparatus can be maintained in a continuous operation.

The pellet-forming material is first subjected to a sufficient amount of heat to get the same into a molten state. Molten pellet-forming material is uniformly fed as successive drops upon a suitable cooling surface where the pellets are substantially instantly cooled and are conveyed immediately from the point of origin so that successive drops can be delivered in a similar manner to the cooling surface.

In order that the operation may be economically effective, it is necessary that a series of drops of the molten material descend upon the cooling surface at the same time, and this involves serious difficulties in the feeding of the pellet-forming material. These difficulties have been overcome and it is possible, therefore, to produce simultaneously a plurality of pellets of substantially uniform size without resorting to molds or other forming devices.

A particular difficulty, which has been overcome, is the maintenance of the pellet-forming material at a suitable temperature so that it will remain in the molten state and therefore be sufficiently mobile to form the drops which eventually fall upon the cooling surface. It is necessary not only that the material be sufficiently mobile, but that the dropper shall be properly spaced from the cooling surface to avoid flattening of the pellets on the one hand, or contact of the dripping material with the cooling surface before it has had a chance to separate from the dropper in the form of drops.

The molten pellet-forming material is made to flow into a plurality of orifices arranged at a uniform level, and the delivery of the material through these orifices to angularly disposed surfaces, designed to deliver drops of the desired size, depends upon the surface tension of the material which is treated when the latter is in a molten condition, and at the proper temperature to ensure the production of the pellets.

It is also essential to the best adaptation of the invention, that foreign matter be separated from the material before it is fed to the cooling surface; this avoids choking of the dropper and uneven operation with resulting non-uniformity of the pellets.

In carrying out the invention, the pellet-forming material is first melted in a suitable retort which may consist of a vertical cylinder of metal with a surrounding gas-fired furnace which is adapted to supply the necessary heat. Gas burners are used preferably because of their effectiveness and the ease with which the heating effect may be controlled, but other heating devices may be utilized. To ensure the desired purity of the material it is preferably filtered. The filtering might be done at the bottom of the retort in which the material is melted. It is preferably carried on in a special filtering vessel adjoining the retort.

In order that the molten material shall not cool to a point sufficiently low to allow its solidification within the dropper, it is preferable to bring the molten filtered material to a temperature well above its melting point to compensate for the loss of heat which takes place as the material flows through the dropper. We accomplish this by providing for superheating the molten material after it leaves the filter and before it passes to the dropper.

The superheated molten material is then passed to the dropper which may also be heated. In this dropper the superheated molten material is subdivided into relatively small streams which fall through a relatively slight but adjustable space before they strike the cooling surface. This space is provided to ensure the breaking up of the streams of molten material into relatively small individual pellet-forming drops. If the space is too small the dripping material will fall upon the cooling surface in stringy or continuous portions. On the other hand, if the space is too great the individual pellet-forming drops will strike the cooling surface with such a force as to substantially flatten them out. Since it is desired that the pellets be substantially round or bean-like, such flattening is to be avoided.

As soon as the individual pellet-forming drops of the dripping molten material strike the cooling surface, a skin-like outer covering of solidified material immediately surrounds the newly formed pellets and helps to prevent spreading or flattening. The pellets solidify rapidly and are soon in condition to be removed from the cooling surface. These newly formed pellets may then be removed in a manner to be more particularly described hereafter.

Our invention will be more fully understood by reference to the accompanying drawings and the following description, in which—

Fig. 1 is a side sectional elevation of the pellet-material-conditioning apparatus, and a side elevation of the pellet-forming apparatus;

Fig. 2 is an enlarged part sectional view and part elevation, of the pellet-forming apparatus shown in Fig. 1;

Fig. 3 is a rear elevation of the pellet-forming apparatus shown in Figs. 1 and 2;

Fig. 4 is a side sectional elevation on the line 4—4 of Fig. 5;

Fig. 5 is a plan of a staggered-hole dropper;

Fig. 6 is a cross-sectional end elevation on the line 6—6 of Fig. 5;

Fig. 7 is a cross-sectional end elevation on the line 7—7 of Fig. 8; and

Fig. 8 is a plan of an unstaggered-hole dropper.

Referring to the drawings, the concrete foundation 10 supports the heating furnace 11 in which the melting pot 12, the filtering tank 13 and the superheater 14 are mounted. The melting pot 12 and the filtering tank 13 are preferably of the same size, and the melting pot is placed relatively higher than the filtering tank so that the contents of the melting pot may be transferred easily to the filtering tank.

The heating furnace 11 is made up of fire brick 15 on the bottoms and the sides thereof. A layer of heat-insulating brick 16, such as sil-o-cel brick, is placed within the main fire brick side walls and the bottom to prevent undue radiation of heat from the heating furnace. The sil-o-cel brick is placed in those sections of the heating furnace structure through which heat would be most liable to radiate. The heating furnace is provided with suitable heating chambers 17, 18 and 19 in which are placed the melting pot 12, the filtering tank 13, and the superheater 14, respectively. Cast iron base frames 20 and steel bands 21 are placed underneath and about the heating furnace 11 to support and retain the walls of the furnace. Cover plates 22 are placed on the top surface of the heating furnace to protect the brick work.

The melting-pot heating-chamber 17 is provided with a brick checker work 23 in which the bricks are so staggered relative to each other that sinuous openings may lead from the outside bottom edges to all parts of the top surface of the same. This checker work is so constructed that the top surface is relatively larger than the base. A square hole 24 leads from the inside of the melting pot heating chamber 17 through the bottom of the heating chamber 11 to the outside atmosphere. A fire brick stopper 25 is used to close up this hole.

The top of the heating chamber 17 closes inwardly to support the melting pot 12 which rests upon the angle iron lugs 26, as well as to provide a space between the walls of the melting pot and the walls of the melting pot heating chamber for the circulation of heating gases. Gas-firing ports 27 lead from the outside of the heating chamber 11 into the heating chamber 17. There are two of these ports, each one leading into the heating chamber 17 from opposite sides. They are used as conduits for the firing gas which is forced into the heating chamber. For that reason they are placed near the bottom of the heating chamber and in close proximity to the checker work 23. A series of gas outlet conduits 28 are provided near the top of the heating chamber 17. Deflectors 29 are placed at the mouths of the gas outlet conduits in order to deflect the escaping gases upwardly.

The melting pot 12 depends within the heating chamber 17 to within a relatively close distance of the top of the checker work 23. This pot rests by means of the angle iron supports 26 upon the cover plates 22. It is equipped with a hinged lid 30 which can be placed upon the pot in a non-leakable manner; and such that pressure may be maintained within the melting pot without forcing the lid from the pot. The opening 31 in the side wall and near the top of the pot or through the top wall of the pot is designed for an inert or non-oxidizing gas connection. The top cover of the pot is preferably equipped with a hole through which a thermo-couple may be introduced to observe temperature conditions within the melting pot. The pipe 32 extends through the top cover of the melting pot to within a short distance of the bottom of the pot. The other end of the pipe passes over to within a short distance of the top cover of the filtering tank 18.

The filtering-tank heating-chamber 18 is disposed within the heating furnace 11 in such manner that the filtering tank 18 may be located at a level relatively lower than that of the melting pot 12. A gas-firing port 33 leads from the outside of the heating furnace 11 into the heating chamber 18. The orifice of this conduit opens into a depressed passageway 34 cut completely around the bottom of the heating chamber 18. Wedge-like keys 35 are placed over this depressed passageway 20 to provide interstices between successive keys. With an arrangement of this kind the burning gas may issue from the orifice of the gas port 33 and circulate about the depressed passageway 34. The interstices between the series of keys provide an escape for the burning gas up to and surrounding the filtering tank 13. A square hole 36 leads vertically from the depressed passageway 34 toward the bottom of the heating furnace 11, and then leads horizontally to the outside atmosphere. As in the case of the opening 24 in the melting-pot heating-chamber, this hole may be opened and closed in order to control the amount of air flowing into the heating chamber 18.

The filtering tank 13 depends within the heating chamber 18. The tank rests by means of the angles 37 upon the cover plate 22 and the angle 38. The top of the tank, like the top of the melting pot, is equipped with a hinged lid 39 which can be non-leakably secured to the tank in order that pressure may be generated and maintained within the filtering tank. A funnel 40 fits into the top of the tank and is designed to receive the contents of the melting pot through the discharge pipe 32. The lower portion of the filtering tank is provided with a perforated cast iron filtering plate 41 under which is placed a filtering medium 42. A perforated cast iron dome 43 is interposed between the filtering medium 42 and the outlet pipe 44.

We have found the following to make an excellent filtering medium:—First, a layer 4" to 6" in depth of coarse steel turnings is placed over the perforated cast iron dome 43 to prevent the finer filtering materials from sifting through the holes in the dome and the cracks between the dome and the filtering tank. Over this is placed a layer, again 4" to 6" in depth, of egg-size lumps of rusted iron borings. A third layer composed of iron carbide or iron carbide-ferrocyanide mixture is then placed upon the iron borings. This layer is about 1" in depth. The filtering medium is then completed by disposing a layer 2" to 4" in depth of hardwood charcoal upon the iron carbide mixture.

An inert gas connection 31 is provided near the top or in the cover of the filtering tank. The purpose of this gas connection is to furnish an inert atmosphere above the molten contents of the tank, as well as to provide pressure by which to force the molten material down through the filtering medium 42. As in the case of the melting pot top, the top of this tank is provided with an aperture through which a thermo-couple can be inserted to observe the temperatures maintained within the filtering tank. The outlet pipe 44 leads vertically from the filtering tank 13 down through the opening 45 in the bottom of the heating furnace 11. A valve 46 is interposed between the end of the outlet pipe 44 and the superheater 19 to regulate the flow of molten material from the filtering tank to the superheater itself.

This end of the heating furnace 11 is equipped with a gas-firing pipe 47 which leads into the combustion chamber 48. Escape outlets 49 in the roof of the combustion chamber 48 offer a means for conducting heating gases from the chamber 48 into the chamber 50 surrounding the superheater 19. The heating chamber 50 communicates with the annular space 45 surrounding the outlet pipe 44, which in turn connects with the heating chamber 18 surrounding the filtering tank 13. Heating gases may thus rise from the combustion chamber 48 through the escape outlets 49 into the heating chamber 50. From chamber 50 they pass up through the annular space 45 into the chamber 18. From this latter chamber they escape through the outlet 51 leading from near the top of the heating chamber 18, through the wall of the heating furnace 11, to the outside atmosphere. The deflecting plate 29 tends to give the escaping gases an upward direction.

The superheater 19 communicates by means of the outlet pipe 52 with the dropper 53 which rests within a relatively short distance of the cooling device. Figs. 4, 5, 6, 7 and 8 illustrate two types of dropping devices that we have found advantageous to use in the practice of our invention. In the first type (Figs. 4, 5 and 6) the dropper holes are staggered, while in the other type (Figs. 7 and 8) the dropper holes are in a straight line.

In the first type above referred to, the pegs 54 fit snugly into the dropper holes 55. These pegs are iron rods bent into a 90° elbow at one end. The top elbow portion of these pegs rests in the grooves 56 which run completely across the raised portion 57 of the dropper. These grooves must not be placed too closely to one another, else when the pegs are in position the molten material will bridge between them due to capillary attraction. If this takes place one peg will get nearly the entire flow which should be distributed between two pegs. For this reason it is necessary to keep the pegs some distance apart. Since it is desirable to make as many drops as possible, we have found that this staggered arrangement of the pegs will lend itself to placing the grooves closer to one another. Because the inlets have alternate pegs which lead first to the right and then to the left, etc., undesirable bridging of the molten material does not quite as readily take place. An annular space 58 completely surrounds the raised portion 57 through which the molten material may circulate as it is fed into the numerous peg openings.

The dropper illustrated by Figs. 7 and 8 is designed like the type illustrated above, except that the dropper holes or peg outlets are uniformly in a straight line. As in the staggered type, the peg inlets are made to lead alternately from left to right.

To prevent undue radiation of heat from the dropper, some insulating material, such as fire brick, is preferably placed upon the top of the dropper. This should be readily removable in order that the operator may easily and quickly have access to the dropper. The superheater outlet 52 fits into the receiving sleeve 59 which depends within the receiving chamber 60.

The dropper 53 is placed relatively to the cooling surface 61 so that there may be a comparatively short interval of space between the bottom outlets of the pegs 54 and the cooling surface, sufficient to permit the formation of individual drops.

The cooling table surface 61, which is formed by a smoothly machined cast iron plate, made to revolve by the shaft 62, has water-cooling chambers 63 placed on the under side. The motor 64, by means of the pinion 65, the gear 66, the worm gear 67, and the main shaft gear 68, is operatively connected to the cooling table 61 to rotate the same. The operating mechanism rests upon the foundation 69 by means of the supporting frame 70.

The driving shaft 62 of the cooling table 61 rests upon the supporting head 71 placed within a babbitted bearing 72 securely fastened to the supporting frame 70 by means of the bolts 73. The cooling table 61 is securely attached to the shaft 62 by means of the head flange 75, the bolts 76, and the key 77. The worm shaft bearing bracket 78, to which is attached the oil splash guard 79, is babbitted to support the worm gear shaft 80, as well as to provide an oil receptacle to keep the worm gearing properly lubricated.

A water storage tank 81, which may be continuously filled from any source, rests over the driving shaft 62 and the cooling table 61. A pipe 83 connects with the T's 84 and the tank 81, to conduct water to the water-cooling chamber 63 placed immediately underneath the cooling table 61. An outlet connection 85 connects the top of the water-cooling chamber 63 with the overflow pipe 86 leading from the top of the water-storage tank 81.

A waste water receiving vessel 87 is placed about the shaft 62 upon the frame 88 supported by the uprights 89 resting upon the supporting frame 70. The supports 89 and the frame 88 are securely fastened to one another by means of the bolts 90. That part of the frame 88 adjacent to the shaft 62, and which there acts as a bearing, is equipped with a conventional greasing device 91. The outlet pipe 92 connects with the waste water-receiving vessel 87.

The scraper blade 93 is adjustably secured to the supporting frame 94 by means of the lifting and lowering device 95. The wing nuts are employed to rigidly secure the scraping blade 93 against the support 94. The scraper blade surface, like the cooling table surface 61, is preferably smoothly machined. The scraper blade is positioned at an angle to gradually deflect and lead the pellets to the outside edge of the revolving cooling table 61.

The operation of the apparatus is as follows: The material to be melted is charged gradually into the melting pot 12.

The firing gas is supplied through the gas ports 27 into the heating chamber 17. The burning gas circulates about the checker work 23 as well as into the open spaces within the checker work. In this manner a suitable amount of heat is stored within the checker work, and it gradually radiates up against the bottom of the melting pot. The very hot gases swirl around within the chamber 17, from bottom to top, against the walls of the melting pot, and finally escape through the outlets 28 to the outside atmosphere.

To make the operation as continuous as possible, relatively large charges of materials are added at intervals. We charge as much as 300 pounds at a time. The molten material is transferred from the melting pot 12 to the filtering pot 13 by means of pipe 32. To accomplish this a pressure of inert gas is maintained in the top of melting pot 12, the pressure being so controlled as to transfer any desired amount or at any desired rate.

Similarly it is desirable to maintain a pressure of inert gas in the top of filter pot 13. Since the molten material may pass through the filtering medium with some difficulty, the inert gas is preferably passed into the filtering tank under pressure. This pressure, if sufficiently large, gradually forces the molten material down through the filtering medium into the outlet pipe 44 leading to the superheater 19. Undesirable ingredients of the molten material accumulate on the perforated cast iron cover 41 or within the filtering medium 42. The door 39, may, of course, be opened from time to time to clean the inside of the filtering tank.

Since it is necessary that the molten material within the filtering tank 13 be as mobile as possible to get it through the filtering medium 42, the auxiliary gas-firing port 33 is supplied with burning gaseous fuel to keep the contents of the filtering tank up to desired temperatures. The burning gases swirl around within the depressed passageway 34, whereupon the highly heated gases gradually escape between the adjacently placed keys 35 and completely envelope the walls of the filtering tank, and finally escape through the conduits 51 to the outside atmosphere.

The filtered molten material which has passed down through the filtering medium 42 gradually finds its way down through the outlet pipe 44 into the superheater 14. The object of this superheater is to raise the temperature of the molten material to a point well above its melting point, to provide an excess of heat in the molten material as it passes through the dropper 53. In this manner congealing or solidifying of the material within the dropper is prevented.

Firing gas is supplied through the pipe 47 into the combustion chamber 48. The hot gases pass up through the escape outlets into the superheater chamber 50. After these gases have superheated the molten material within the superheater 14, the hot gases circulate about the outlet pipe 44 in the chamber 45, and ultimately mingle with the hot gases fired through the port 33. The combined gases ultimately find their way through the outlet 51 into the outside atmosphere.

The now superheated molten material passes into the dropper 53 and completely surrounds the raised portion 57. The continuous stream of molten material in the annular passageway 58, surrounding this raised portion 57, is gradually subdivided into relatively small streams as the molten material finds its way through the numerous grooves 56 around the loosely-fitting pegs resting therein.

The molten material finds its way down the outside of the pegs and drops off the lower ends thereof. It is necessary that the molten material be fed in such manner that the individual streams which have found their way onto each individual peg may drop off the end thereof in order to form separate drops. These separate drops fall through the space between the bottoms of the pegs and the cooling surface of the smoothly machined cast iron table 61. As soon as these drops strike the relatively cool surface 61 they almost immediately congeal or sufficiently solidify to form individual pellets.

Since the cooling table 61 is made to continuously rotate, the successively falling drops of molten material find a fresh and clean cooling surface upon which to drop. By the time the individual drop lying on the relatively cold table 61 has reached the stationary scraping blade 93, it has become sufficiently solidified to assume its final pellet form. The scraper 93 conducts the newly formed pellets to the outside edge of the revolving table 61 where they are collected in any appropriate manner.

The cooling table absorbs a great deal of heat from the individual molten drops which have fallen upon it. Hence, it is important that this heat be extracted from the cooling table before the heated portion has again reached the dropper. Continuously flowing cold water is used to absorb and carry away this heat. Water is fed into the tank 81 and finds its way to the T's 84 where it is subdivided, and flows through the pipes 83 into the water-cooling chamber 63. Any overflow from the tank 81 passes down through the outlet pipe 86. The cold water passes from the pipe 83 into the water-cooling chamber 63, at the far edge of the same, while the water which has extracted the heat from the table surface passes up through the outlet 85 into the overflow pipe 86. This waste water accumulates in the stationary receiving vessel 87 surrounding the shaft 62 and ultimately finds its way down through the outlet 92.

The cooling member 61 is rotated by the motor 64. The shaft of the motor operates the pinion 65, the gear 66, the worm gear 67, and the worm gear 68 attached to the shaft 62. The shaft 62 and the cooling table 61 are attached to one another by means of the key 77.

It is thus seen that in the practice of our invention we are able to feed raw materials into the melting pot and ultimately and continuously collect the same at the end of the process in highly desired pellet form.

Various changes can be made in the details of operation and in the apparatus as described without departing from the invention or sacrificing the advantages thereof.

We claim:—

1. The method of manufacturing pellets from molten material, which comprises subjecting pellet-forming material to a heat of sufficiently high temperature to get the material into a molten state, filtering said molten material, delivering small portions of the molten material in the form of drops upon a relatively cool surface, and removing the newly formed pellets.

2. The method of forming pellets from molten material, which comprises subjecting pellet-forming material to a heat of sufficiently high temperature to get the material into a molten state, filtering said molten material, superheating the filtered molten material, and delivering small portions of said superheated material in the form of drops upon a relatively cool surface, and removing the pellets.

3. The method of forming pellets from molten material, which comprises subjecting pellet-forming material to a heat of sufficiently high temperature to get the material into a molten state, filtering said molten material, superheating the filtered molten material, and delivering small portions of said superheated material in the form of drops upon a relatively cool surface, and continuously removing the pellets.

4. The method of forming pellets from molten material, which comprises subjecting pellet-forming material to a heat of sufficiently high temperature to get the material into a molten state, filtering said molten material under pressure, delivering small portions of the molten material in the form of drops upon a relatively cool surface, and removing the newly formed pellets.

5. The method of forming pellets from molten material, which comprises subjecting pellet-forming material to a heat of sufficiently high temperature to get the material into a molten state, filtering said molten material under pressure, superheating the filtered molten material, delivering small portions of said superheated material in the form of drops upon a relatively cool surface, and removing the newly formed pellets.

6. The method of forming pellets from molten material, which comprises superheating the molten material to a temperature well above its melting point, subdividing the superheated material into a plurality of relatively small streams, delivering the superheated material through a relatively short space to form substantially uniformly sized individual drops, suddenly cooling said drops into pellets, and removing the newly formed pellets.

7. The method of forming pellets from molten material, which comprises subjecting pellet-forming material in a non-oxidizing atmosphere to a heat of sufficiently high temperature to get the material into a molten state, filtering said molten material while under the pressure of a non-oxidizing atmosphere, delivering the molten material in the form of individual drops through a short space, suddenly cooling said molten drops and removing the newly formed pellets.

8. An apparatus for making pellets, which comprises means for heating pellet-forming material into a molten state, means for filtering the molten material, means for subdividing the filtered material into a plurality of small streams, means for delivering the streams through space to form individual drops, and means for cooling the drops into pellets.

9. An apparatus for making pellets, which comprises means for heating pellet-forming material into a molten state, means for superheating the molten material, means for subdividing the molten material into a plurality of small streams, means for delivering the small streams through space to form individual drops, and means for cooling the drops into pellets.

10. An apparatus for making pellets, which comprises means for heating pellet-forming material into a molten state, means for filtering the molten material, means for superheating the molten material, means for subdividing the filtered material into a plurality of small streams, means for delivering the small streams through space to form individual drops, and means for cooling the drops into pellets.

11. An apparatus for making pellets, which comprises means for heating pellet-forming material into a molten state, means for filtering the molten material under pressure, means for subdividing the filtered material into a plurality of small streams, means for delivering the small streams through space to form individual drops, and means for cooling the drops into pellets.

12. An apparatus for making pellets from molten material, which comprises means for raising the temperature of the molten material above its melting point, means for forming a plurality of substantially uniform sized drops of said molten material, means for suddenly cooling said drops into pellets, and means for removing the newly formed pellets.

13. An apparatus for making pellets from molten material, which comprises means for raising the temperature of the molten material above its melting point, means for forming a plurality of substantially uniformly sized drops of said molten material including a device for continuously subdividing the molten material into relatively small streams which can be delivered through a relatively short space to form individual drops, means for suddenly cooling said drops into pellets, and means for removing the newly formed pellets.

14. An apparatus for making pellets from molten material, which comprises means for raising the temperature of the molten material above its melting point, means for forming a plurality of substantially uniformly sized drops of said molten material, means for suddenly cooling said drops into pellets including an indirectly cooled moving surface upon which the drops of molten material drop, and means for removing the newly formed pellets.

15. An apparatus for making pellets from molten material, which comprises means for subjecting pellet-forming material in a non-oxidizing atmosphere to a heat of sufficiently high temperature to get the material into a molten state, means for filtering said molten material while under the pressure of a non-oxidizing atmosphere, means for dropping small portions of the molten material in the form of individual drops through a short space, means for suddenly cooling said molten drops, and means for removing the newly formed pellets.

In testimony whereof we affix our signatures.

ROBERT W. POINDEXTER, Jr.
HARRY J. MORGAN.